(12) United States Patent
Fleck et al.

(10) Patent No.: US 9,709,128 B2
(45) Date of Patent: Jul. 18, 2017

(54) ARTICLE, PARTICULARLY DRIVE BELT, HAVING A TEXTILE LAYER AND METHOD FOR PRODUCING A DRIVE BELT

(75) Inventors: Andreas Fleck, Garbsen (DE); Henning Kanzow, Hannover (DE); Claus-Lüder Mahnken, Ahausen (DE); Siegmar Gebhardt, Hannover (DE); Antoine Ishak, Hannover (DE); Marko Schleicher, Seelze (DE); Reinhold Moses, Eimen (DE); Thomas Baltes, Hannover (DE); Reinhard Teves, Seelze (DE)

(73) Assignee: ContiTech Antriebssysteme GmbH, Hannover (DE)

( * ) Notice: Subject to any disclaimer, the term of this patent is extended or adjusted under 35 U.S.C. 154(b) by 1801 days.

(21) Appl. No.: 13/110,149

(22) Filed: May 18, 2011

(65) Prior Publication Data
US 2011/0269588 A1  Nov. 3, 2011

Related U.S. Application Data

(63) Continuation of application No. PCT/EP2009/062730, filed on Oct. 1, 2009.

(30) Foreign Application Priority Data

Nov. 18, 2008  (DE) .................. 10 2008 037 561

(51) Int. Cl.
 *B32B 5/02* (2006.01)
 *F16G 1/10* (2006.01)
 (Continued)

(52) U.S. Cl.
 CPC .............. *F16G 1/10* (2013.01); *F16G 5/08* (2013.01); *F16G 5/20* (2013.01); *Y10T 442/20* (2015.04)

(58) Field of Classification Search
 CPC ...... F16G 1/10; F16G 5/20; F16G 5/08; Y10T 442/20
 (Continued)

(56) References Cited

U.S. PATENT DOCUMENTS

| 2,800,701 A | * | 7/1957 | Watts et al. ............ 198/847 |
| 3,981,206 A | | 9/1976 | Miranti, Jr. et al. |

(Continued)

FOREIGN PATENT DOCUMENTS

| DE | 38 23 157 A1 | 2/1990 |
| DE | 10 2008 012 044 A1 | 9/2009 |

(Continued)

OTHER PUBLICATIONS

International Search Report dated Jan. 21, 2010 of international application PCT/EP 2009/062730 on which this application is based.

*Primary Examiner* — Elizabeth M Cole
(74) *Attorney, Agent, or Firm* — Walter Ottesen, P.A.

(57) ABSTRACT

The invention relates to an article including an elastic main body on the basis of a vulcanized rubber (17) having an article surface that is susceptible to wear, which is provided with a textile layer. The textile layer, particularly a woven fabric (16) or knitted fabric, has a mesh design that allows the vulcanized rubber (17) to penetrate to the textile surface to form a textile-vulcanized rubber hybrid system (15), wherein the vulcanized rubber portion on the textile surface can be controlled by means of the stitch number, stitch width and the thread design of the textile layer. The article is in particular a drive belt and in connection with the primary intended use, a method for making a drive belt is provided.

25 Claims, 2 Drawing Sheets

(51) Int. Cl.
*F16G 5/08* (2006.01)
*F16G 5/20* (2006.01)

(58) Field of Classification Search
USPC .................. 442/43, 182, 304, 59; 156/307.1
See application file for complete search history.

(56) References Cited

U.S. PATENT DOCUMENTS

| | | |
|---|---|---|
| 5,417,618 A | 5/1995 | Osako et al. |
| 6,572,505 B1 | 6/2003 | Knutson |
| 7,128,674 B2 | 10/2006 | Teves et al. |
| 7,749,118 B2 | 7/2010 | Baldovino et al. |
| 2006/0073752 A1* | 4/2006 | Enzien et al. .................. 442/76 |
| 2007/0240658 A1* | 10/2007 | Baldovino et al. ........ 123/90.31 |
| 2007/0249451 A1 | 10/2007 | Wu et al. |
| 2008/0032837 A1 | 2/2008 | Unruh et al. |
| 2008/0261739 A1 | 10/2008 | Kanzow et al. |

FOREIGN PATENT DOCUMENTS

| | | |
|---|---|---|
| WO | WO 98/19632 A1 | 5/1998 |
| WO | WO 2009/034748 A1 | 3/2009 |

\* cited by examiner

ARTICLE, PARTICULARLY DRIVE BELT, HAVING A TEXTILE LAYER AND METHOD FOR PRODUCING A DRIVE BELT

CROSS REFERENCE TO RELATED APPLICATIONS

This application is a continuation application of international patent application PCT/EP 2009/062730, filed Oct. 1, 2009, designating the United States and claiming priority from German application 10 2008 037 561.6, filed Nov. 18, 2008, and the entire content of both applications is incorporated herein by reference.

FIELD OF THE INVENTION

This invention relates to an article having an elastic foundational body based on a vulcanizate having a wear-susceptible article surface which is provided with a textile cover ply. The elastic foundational body is usually additionally endowed with an embedded strength or tension-resisting element, which may be embodied with one or more plies.

BACKGROUND OF THE INVENTION

An article exposed to the dynamic stresses and thus also to wear as well as noise development is for example a band, belt, hose, air spring lobe, compensator or multilayered web of which the belt in the form of a drive belt is of particular relevance. The elastic foundational body of the drive belt comprises a top ply as belt backing and a substructure with a force transmission zone. For this, reference is made particularly to the following patent literature: DE 38 23 157 A1, DE 10 2006 007 509 A1 (United States patent application publication US 2008/0261739), U.S. Pat. No. 7,749,118, United States patent application publication US 2008/0032837, U.S. Pat. Nos. 3,981,206 and 5,417,618.

Drive belts in particular are coated with a coating in the region of the force transmission zone in particular for noise reduction and also enhanced abrasion resistance. The prior art in this respect is:

Use is made of a flocked cover ply, particularly in the form of a cotton or aramid flock, or of a thin elastic polymeric layer filled with fibers (aramid fibers for example), for example as described in unexamined application DE 38 23 157 A1, wherein the flocked cover ply is usually attached by means of a solution. However, this coating is not durable with some engines. Moreover, noise problems occur with some engines in the case of moisture.

A loop-drawingly knitted textile cover ply, for example as described in U.S. Pat. No. 3,981,206 is used. The disadvantage here is that test engines give rise to noise in the presence of moisture.

A textile cover ply in the form of a formed-loop knit fabric is used. Unexamined application DE 10 2006 007 509 A1 in particular is cited in this regard. The warp-knit fabric consists of a first yarn, more particularly composed of a polyamide (PA) or polyester (PES), and of a second yarn, more particularly composed of a polyurethane (PU). Again the disadvantage is that test engines give rise to noise in the presence of moisture.

In a more recent development described in DE 10 2008 012 044.8, a self-supporting film/sheet (of PTFE for example) or a film/sheet laminate (a PA PTFE film/sheet laminate for example) is used instead of textile cover plies or in combination therewith, particularly under the aspect of rendering a drive belt oil resistant.

However, the research and development focus is on textile cover plies, which also form the basis for the underlying generic article, in particular a drive belt.

In what follows, the issues surrounding the coefficient of friction (COF) are more particularly discussed in connection with the various coating systems.

Hitherto, various coating systems have been used for different COF target values, see the abovementioned embodiments according to the prior art. Certain properties in respect of durability, noise behavior and coefficient of friction result therefrom as a compromise. The coefficient of friction is subject to fluctuations even in virgin parts, and will in some instances change appreciably in the course of the use life of an article, particularly in the case of a drive belt. Particular coefficients of friction, desired by the customer for various reasons, are therefore very difficult to achieve, if at all.

SUMMARY OF THE INVENTION

Against the background of the abovementioned problems with the use of a textile cover ply, the object of the invention aims to provide an article of the type in question where there is a possible way to specifically and accurately set the coefficient of friction (COF) of an article within a range given by the materials, while realizing customer wishes with regard to the optimization of noise behavior.

We have found that this object is achieved when the textile cover ply includes a mesh construction which permits the passage of the vulcanizate to the textile surface to form a textile-vulcanizate hybrid system, wherein the vulcanizate fraction at the textile surface is controllable via the mesh count, mesh size and thread construction of the textile cover ply.

The textile cover ply is preferably a woven, formed-loop knit or drawn-loop knit fabric, although the formation of the hybrid system is best actualized by using a stretchable woven fabric, stretchable formed-loop knit fabric or stretchable drawn-loop knit fabric. This is because in the case of a stretchable woven fabric for example there is the possibility of modifying the mesh size via a specifically introduced extension in the course of the woven fabric being laid onto the unfinished article, more particularly onto the sleeve (intermediate stage of belt manufacture). The controlling of the vulcanizate fraction is based on adjusting the mesh count, mesh size and thread construction of the textile structure used having regard to the extension which the textile cover ply experiences in the course of the forming operation, as will be more particularly elucidated in connection with the figure description.

Between the foundational body and the textile cover ply there is embedded a coating mass which together with the vulcanizate appears at the textile surface to form a textile-vulcanizate-coating hybrid system. This coating mass is more particularly a chemical- and oil-resistant polymer, particularly in turn a fluoropolymer and/or a polyurethane (PU). The fluoropolymer is polytetrafluoroethylene (PTFE) and/or polyvinyl fluoride (PVF) and/or polyvinylidene fluoride (PVDF). PTFE is of particular importance. The coating mass may additionally be rendered adhesive, for example through admixture of resins.

The term "vulcanizate" encompasses all vulcanizable elastomeric mixtures, with the rubber mixtures being of particular importance. With regard to advantageous vulcanizates, more particular exposition follows in the course of the figure description.

The novel hybrid concept is used particularly in the manufacture of a band, belt, hose, air spring lobe (axial lobe, cross-laid lobe), compensator or multilayered web. The use of the novel hybrid concept is outstandingly important in the manufacture of a drive belt which may be constructed as a flat belt, V belt, V ribbed belt, toothed belt, clutch belt or elevator belt.

In connection with the abovementioned focus it is a further object of the present invention to provide a process for producing a drive belt with textile cover ply wherein the COF value of the textile cover ply is adjustable, particularly under the additional aspect of economic viability.

We have found that this object is achieved by at least the following process steps:
- providing the unvulcanized belt blank with a textile cover ply which includes a mesh structure enabling the vulcanizable mixture of elastomer to pass to the textile surface;
- finally vulcanizing the belt blank provided with the textile cover ply to form a textile-vulcanizate hybrid system, wherein the vulcanizate fraction at the textile surface is controlled via the mesh count, mesh size and thread construction of the textile cover ply.

With regard to the nature of the textile cover ply, the textile-technological control concept and the additional use of a coating mass, reference is made to the abovementioned matter.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
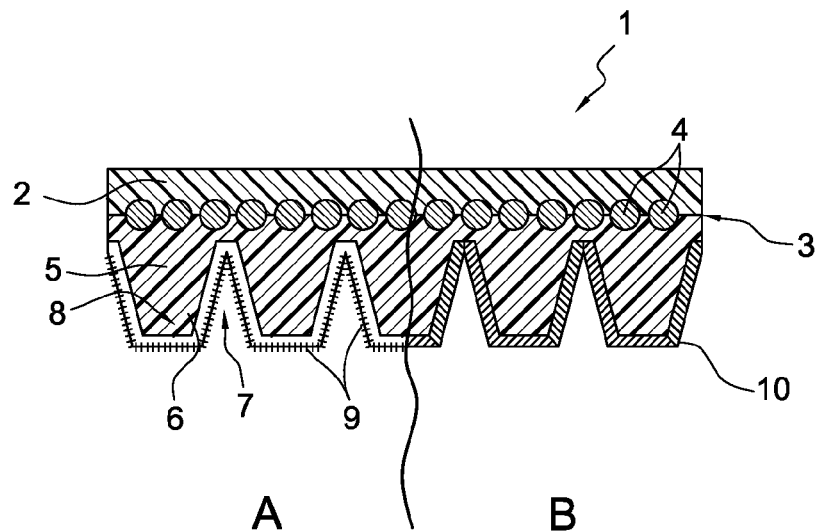
FIG. 1 shows a drive belt in the form of a V-ribbed belt having a textile cover ply within the force transmission zone.

FIG. 1 shows a drive belt 1 in the form of a V-ribbed belt having a top ply 2 as belt backing, a strength element ply 3 having tension-resisting elements in a parallel arrangement in the longitudinal direction, and also having a substructure 5. The substructure includes a V-ribbed structure formed of ribs 6 and grooves 7. The substructure comprises the force transmission zone 8.

The top ply 2 and the substructure 5 together form the elastic foundational body based on a vulcanizate, more particularly in the form of a vulcanized mixture of rubber containing at least one rubber component and mixture ingredients. As rubber component is used more particularly an ethylene-propylene copolymer (EPM), an ethylene-propylene-diene monomer copolymer (EPDM), (partly) hydrogenated nitrile rubber (HNBR), chloroprene rubber (CR), fluoro rubber (FKM), natural rubber (NR), styrene-butadiene rubber (SBR) or butadiene rubber (BR), which are used uncut or cut with at least one further rubber component, more particularly in conjunction with one of the aforementioned types of rubber, for example in the form of an EPM-EPDM or SBR BR blend. Of particular importance here is EPM or EPDM or an EPM-EPDM blend. The mixture ingredients comprise at least one crosslinker or a crosslinker system (crosslinking agent and accelerator). Further mixture ingredients are usually additionally a filler and/or a processing auxiliary and/or a plasticizer and/or an antioxidant and also, optionally, further added substances, for example fibers and color pigments. The general state of the rubber mixture arts is referenced here.

The tension-resisting elements are more particularly single cords, for example of steel, polyamide, aramid, polyester, glass fibers, carbon fibers, polyetheretherketone (PEEK) or polyethylene 2,6-naphthalate (PEN).

Within the force transmission zone 8, the drive belt 1 is provided with a flocked cover ply 9 (section A) in accordance with the prior art.

By comparison, the novel drive belt 1 includes, within its force transmission zone, the modified textile cover ply which will be more particularly described in conjunction with FIGS. 2 to 5.

The top ply 2 of the drive belt 1 can be uncoated. Frequently, this top ply is also provided with a coating. Usually, a coating according to the prior art will be sufficient. The introductory part of the description is referenced in this respect. However, the top ply 2 can also be endowed with the novel modified textile cover ply to form a textile-vulcanizate hybrid system.

Figures 2, 3:
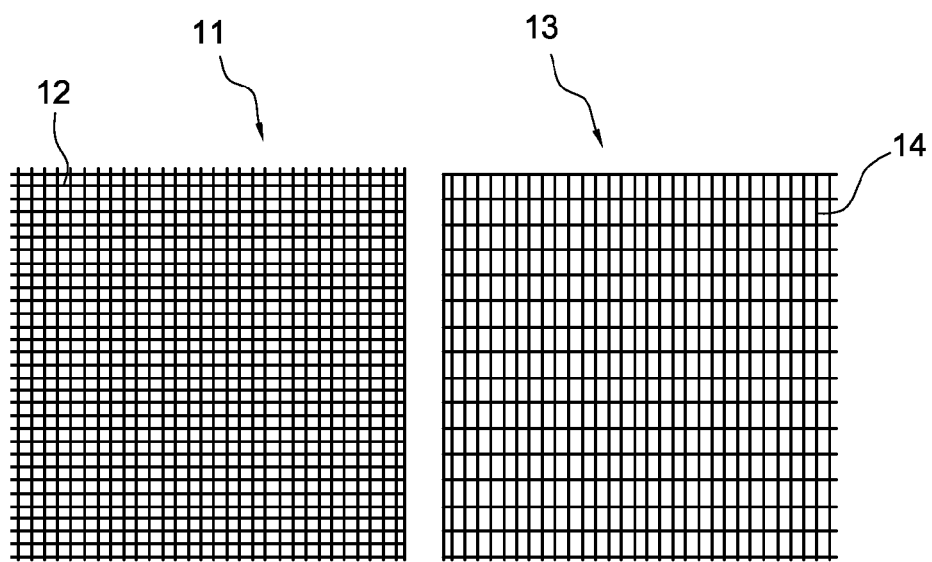
FIG. 2 shows a woven fabric having a small mesh size.
FIG. 3 shows a woven fabric having a large mesh size.

FIG. 2 shows a textile cover ply 11 in the form of a woven fabric having a mesh construction 12 of low mesh size. By contrast, the textile cover ply 13 shown in FIG. 3 is a woven fabric having a mesh construction 14 with a large mesh size. Thus, the controlling of the vulcanizate fraction is based on adjusting the mesh count, mesh size and thread construction of the textile construction used having regard to the extension which the textile cover ply experiences in the course of the forming operation. The mesh count is, for example, set and fixed in upstream operating steps during the processing of the woven fabric. However, the mesh count can also be set directly in the course of the textile layer being laid onto the sleeve. The textile cover ply 13 according to FIG. 3, as compared with the textile cover ply 11 according to FIG. 2, has a larger mass of vulcanizate coming to the textile surface, owing to the larger mesh size coupled with a smaller mesh count.

Figure 4:
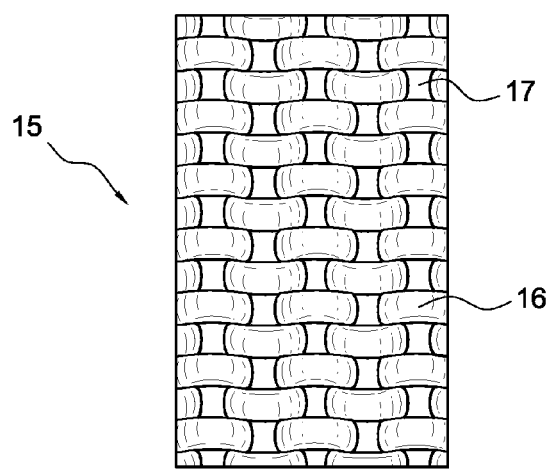
FIG. 4 shows the hybrid surface of a textile-vulcanizate hybrid system.

FIG. 4, then, shows the hybrid surface of a textile-vulcanizate hybrid system 15, comprising a textile cover ply 16, configured as a woven fabric, and a vulcanizate 17 in the form of a vulcanized mixture of rubber (gum).

In the context of an exemplary embodiment, the textile cover ply 16 consists of a woven cotton fabric having a surface fraction of 68% and a COF value of 0.9 ("purely fabric"). The vulcanizate 17 is EPDM coupled with a surface fraction of 32% and a COF value of 2.5 ("purely gum"). The combination of cotton and EPDM thus makes it possible to set a COF value between 0.9 and 2.5. Accuracy is about+0.1 to 0.2, according to current test results. In the case of the present exemplary embodiment, the COF value of the hybrid surface is 1.41 (68%×0.9 +32%×2.5). The COF value measured in the test rig was 1.49.

When the surface is sufficiently wear-resistant, the COF value changes only minimally during belt life, since the areal fractions of textile and vulcanizate remain constant.

The table which follows records the COF value as a function of the fraction of the cotton fabric ("Fabric" in the table for short) and of the EPDM fraction ("Gum" in the table for short).

| Fabric | Gum | COF |
|--------|------|------|
| 0%   | 100% | 2.5  |
| 10%  | 90%  | 2.34 |
| 20%  | 80%  | 2.18 |
| 30%  | 70%  | 2.02 |
| 40%  | 60%  | 1.86 |
| 50%  | 50%  | 1.7  |
| 60%  | 40%  | 1.54 |
| 70%  | 30%  | 1.38 |
| 80%  | 20%  | 1.22 |
| 90%  | 10%  | 1.06 |
| 100% | 0%   | 0.9  |

Figure 5:
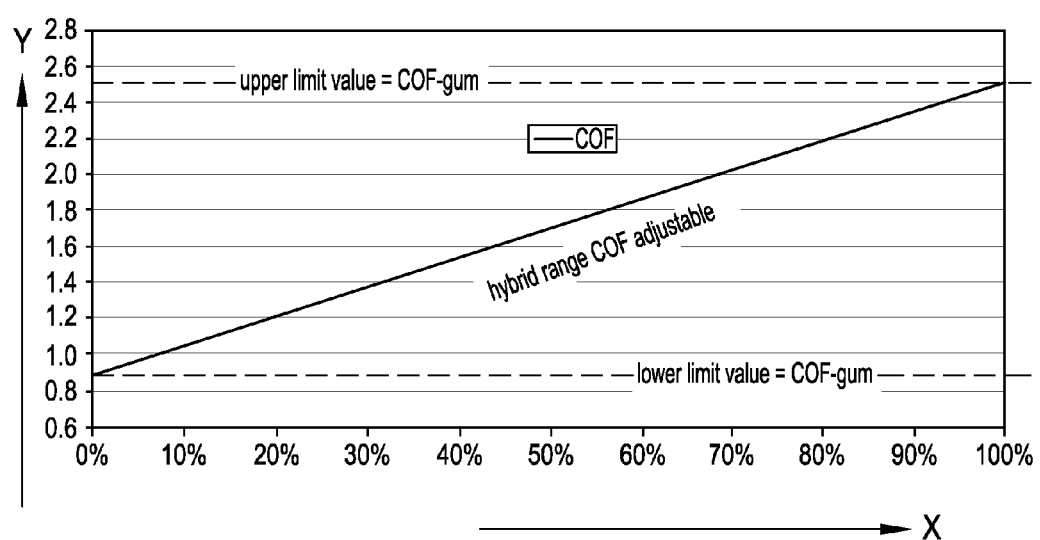
FIG. 5 shows a diagrammatic depiction of the COF value as a function of the vulcanizate fraction at the hybrid surface.

The diagram according to FIG. 5 depicts the COF value (Y ordinate) as a function of the gum fraction (X abscissa), comprising the lower limit (COF fabric), the upper limit (COF gum) and the hybrid region with the adjustable COF-value.

A coating mass as more particularly described at the beginning can be embedded between the gum and the fabric, this coating mass in turn forming a further component of the surface after passing through the fabric meshes in the course of vulcanization. Via a suitable choice of material for a coating mass, the COF value can be adjusted in parts independently of the foundational polymer of the drive belt.

It is understood that the foregoing description is that of the preferred embodiments of the invention and that various changes and modifications may be made thereto without departing from the spirit and scope of the invention as defined in the appended claims.

LIST OF REFERENCE SYMBOLS (Part of the Description)
1 drive belt (V-ribbed belt)
2 top ply (belt backing)
3 strength element ply
4 tension-resisting element in the form of single cords
5 substructure
6 ribs
7 grooves
8 force transmission zone
9 flocked cover ply (section A)
10 textile cover ply (section B)
11 textile cover ply in the form of a woven fabric
12 mesh construction of low mesh size
13 textile cover ply in the form of a woven fabric
14 mesh construction of large mesh size
15 textile-vulcanizate hybrid system
16 textile cover ply in the form of a woven fabric
17 vulcanizate
X fraction of vulcanizate (gum)
Y COF value

What is claimed is:

1. An article having an elastic foundational body based on a vulcanizate having a wear-susceptible article surface which is provided with a textile cover ply, wherein the textile cover ply includes a mesh construction, which permits the passage of the vulcanizate to the textile surface to form a textile-vulcanizate hybrid system, wherein the vulcanizate fraction at the textile surface is controllable via the mesh count, mesh size and thread construction of the textile cover ply,
wherein between the foundational body and the textile cover ply there is embedded a coating mass which together with the vulcanizate appears at the textile surface to form a textile-vulcanizate-coating hybrid system, and
wherein the coating mass is a chemical- and/or oil-resistant polymer.

2. The article according to claim 1, wherein the article is a band, belt, hose, air spring lobe, compensator or multilayered web.

3. An article in the form of a drive belt having an elastic foundational body based on a vulcanizate, comprising a top ply as belt backing and a substructure with a force transmission zone, wherein the top ply and/or the particularly wear-susceptible force transition zone is/are provided with a textile cover ply, wherein the textile cover ply includes a mesh construction, which permits the passage of the vulcanizate to the textile surface to form a textile-vulcanizate hybrid system, wherein the vulcanizate fraction at the textile surface is controllable via the mesh count, mesh size and thread construction of the textile cover ply
wherein between the foundational body and the textile cover ply there is embedded a coating mass which together with the vulcanizate appears at the textile surface to form a textile-vulcanizate-coating hybrid system, and
wherein the coating mass is a chemical- and/or oil-resistant polymer.

4. The article according to claim 3, wherein the drive belt is configured as a flat belt, a V-belt, a V-ribbed belt, a toothed belt, a clutch belt or an elevator belt.

5. The article according to claim 1, wherein the textile cover ply is a woven fabric, a formed-loop knit fabric or a drawn-loop knit fabric.

6. The article according to claim 5, wherein the textile cover ply is a stretchable woven fabric, a stretchable formed-loop knit fabric or a stretchable drawn-loop knit fabric.

7. The article according to claim 1, wherein the controlling of the vulcanizate fraction is based on adjusting the mesh count, mesh size and thread construction of the textile structure used having regard to the extension which the textile cover ply experiences in the course of the forming operation.

8. The article according to claim 1, wherein the coating mass is a fluoropolymer and/or a polyurethane (PU).

9. The article according to claim 8, wherein the fluoropolymer is selected from the group consisting of polytetrafluoroethylene (PTFE), polyvinyl fluoride (PVF), and polyvinylidene fluoride (PVDF) or a mixture thereof.

10. The article according to claim 9, wherein the fluoropolymer is PTFE.

11. The article according to claim 1, wherein the elastic foundational body is a vulcanizate based on a vulcanized mixture of rubber containing at least one rubber component and mixture ingredients.

12. The article according to claim 11, wherein the rubber component is selected from the group consisting of an ethylene-propylene copolymer (EPM), an ethylene-propylene-diene monomer copolymer (EPDM), (partly) hydrogenated nitrile rubber (HNBR), chloroprene rubber (CR), fluoro rubber (FKM), natural rubber (NR), styrene-butadiene rubber (SBR) and butadiene rubber (BR), which are used uncut or cut with at least one further rubber component.

13. The article according to claim 12, wherein the rubber component is EPM or EPDM or an EPM-EPDM blend.

14. A process for producing a drive belt having an elastic foundational body based on a vulcanizable mixture of an elastomer forming a vulcanizate, comprising a top ply as belt backing and a substructure with a force transmission zone, wherein the top ply and/or the force transmission zone is/are provided with a textile cover ply, comprising:
- providing the unvulcanized belt blank with a textile cover ply, which includes a mesh construction enabling the vulcanizable mixture of elastomer to pass to the textile surface;
- finally vulcanizing the belt blank provided with the textile cover ply to form a textile-vulcanizate hybrid system, wherein the vulcanizate fraction at the textile surface is controlled via the mesh count, mesh size and thread construction of the textile cover ply, and
- disposing a coating mass between the foundational body and the textile cover ply before the belt blank is finally vulcanized, the coating mass appearing together with the vulcanizate at the textile surface to form a textile-vulcanizate-coating hybrid system,
- wherein a chemical- and/or oil-resistant polymer is/are used as the coating mass.

15. The process according to claim 14, wherein the textile cover ply is selected from the group consisting of a woven fabric, a formed-loop knit fabric and a drawn-loop knit fabric.

16. The process according to claim 15, wherein the textile cover ply is selected from the group consisting of a stretchable woven fabric, a stretchable formed-loop knit fabric and a stretchable drawn-loop knit fabric.

17. The process according to claim 14, where the controlling of the vulcanizate fraction of the textile cover ply is based on adjusting the mesh count, mesh size and thread construction of the textile construction used before the vulcanization having regard to the extension which the textile cover ply experiences in the course of the forming operation.

18. The process according to claim 14, wherein a fluoropolymer and/or a polyurethane (PU) is/are used as the coating mass.

19. The process according to claim 18, wherein polytetrafluoroethylene (PTFE) and/or polyvinyl fluoride (PVF) and/or polyvinylidene fluoride (PVDF) is/are used as fluoropolymer.

20. The process according to claim 19, wherein PTFE is used.

21. The process according to claim 14, wherein the elastic foundational body used is a vulcanizable mixture of rubber containing at least one rubber component and mixture ingredients.

22. The process according to claim 21, wherein the rubber component used is an ethylene-propylene copolymer (EPM), an ethylene-propylene-diene monomer copolymer (EPDM), (partly) hydrogenated nitrile rubber (HNBR), chloroprene rubber (CR), fluoro rubber (FKM), natural rubber (NR), styrene-butadiene rubber (SBR) or butadiene rubber (BR), which are used uncut or cut with at least one further rubber component.

23. The process according to claim 22, wherein the rubber component used is EPM or EPDM or an EPM-EPDM blend.

24. The article according to claim 12, wherein the at least one further rubber component is selected from the group consisting of an ethylene-propylene copolymer (EPM), an ethylene-propylene-diene monomer copolymer (EPDM), (partly) hydrogenated nitrile rubber (HNBR), chloroprene rubber (CR), fluoro rubber (FKM), natural rubber (NR), styrene-butadiene rubber (SBR) and butadiene rubber (BR).

25. The process according to claim 22, wherein the at least one further rubber component is selected from the group consisting of an ethylene-propylene copolymer (EPM), an ethylene-propylene-diene monomer copolymer (EPDM), (partly) hydrogenated nitrile rubber (HNBR), chloroprene rubber (CR), fluoro rubber (FKM), natural rubber (NR), styrene-butadiene rubber (SBR) and butadiene rubber (BR).

* * * * *

UNITED STATES PATENT AND TRADEMARK OFFICE
CERTIFICATE OF CORRECTION

PATENT NO. : 9,709,128 B2  
APPLICATION NO. : 13/110149  
DATED : July 18, 2017  
INVENTOR(S) : A. Fleck et al.

Page 1 of 1

It is certified that error appears in the above-identified patent and that said Letters Patent is hereby corrected as shown below:

In the Specification

In Column 4:
Line 60: delete "+0.1" and insert -- ±0.1 -- therefor.

Signed and Sealed this
Seventeenth Day of October, 2017

Joseph Matal
*Performing the Functions and Duties of the
Under Secretary of Commerce for Intellectual Property and
Director of the United States Patent and Trademark Office*